July 20, 1954 — H. G. BECK — 2,683,905
GASKET WITH PRESSURE LEG AND TRIM FLAP
Filed Oct. 20, 1950

INVENTOR
Howard G. Beck
BY Evans & McCoy
ATTORNEYS

Patented July 20, 1954

2,683,905

UNITED STATES PATENT OFFICE 2,683,905

GASKET WITH PRESSURE LEG AND TRIM FLAP

Howard G. Beck, Irwin, Pa., assignor to The General Tire and Rubber Company, Akron, Ohio, a corporation of Ohio Application October 20, 1950, Serial No. 191,259

6 Claims. (Cl. 20—56.4)

This invention relates to improvements in flexible linear seals for waterproofing, glazing, and sealing two panels together, and in particular it relates to a seal having a garnish leg for use in connection with seals for glazing and holding together panels, such as windshields on motor vehicles.

One object of the present invention is to provide an attractive garnish flap or leg which forms a tight seal with the automobile truck or body and conceals abrupt corners and surface junctures.

Another object of the present invention is to provide a trim strip or garnish leg integral with the sealing gasket and thus eliminate the necessity of a separate trim strip hung on or attached to the sealing agent.

Another object is to provide a sealing gasket with an attached garnish strip which can be adapted to various automobile and truck body formations and at the same time form a tight seal with the body.

Other objects and advantages will become apparent from an examination of the specification and the drawings, in which.

Figure 1:
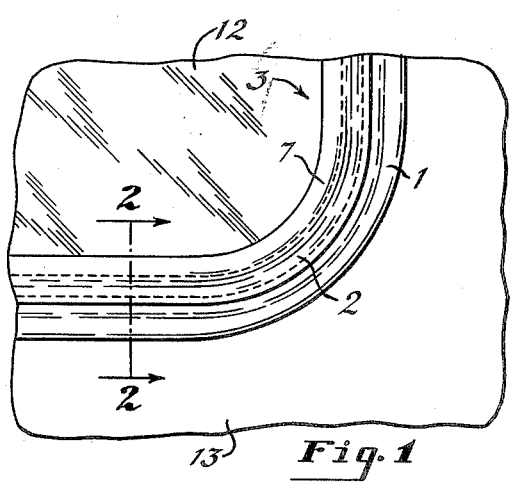
Figure 1 is a front elevation of a corner of an automobile windshield showing the garnish leg of the present invention as finally positioned.

Referring now to the drawings in which like numerals refer to like parts, it is seen that the present invention relates to a novel garnish leg 1 and pressure leg 2 formed on a sealing gasket 3 as shown. The gasket or seal comprises a linear strip of extruded rubber or rubberlike material as shown.

Figure 2:
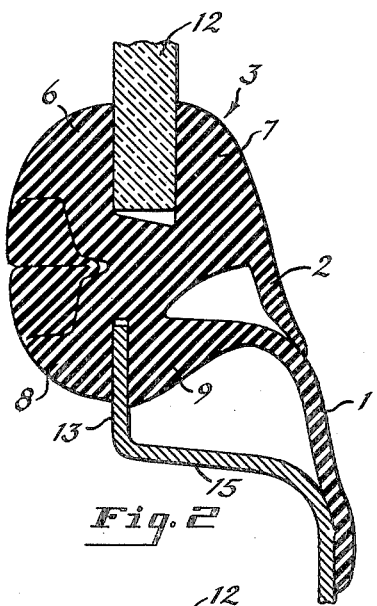
Fig. 2 is a cross-section taken along line 2—2 in Fig. 1 showing the sealing gasket as assembled with the glass panel and automobile body.
Figure 4:
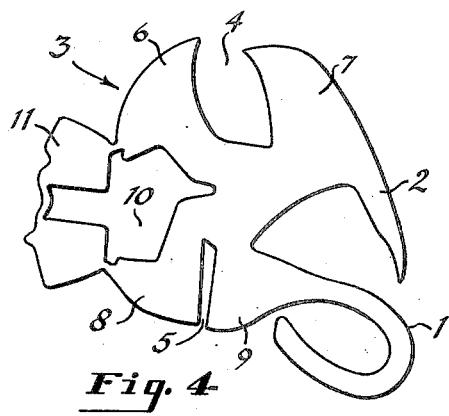
Fig. 4 is a cross-sectional view showing the sealing gasket in its natural shape or as extruded.
Figure 3:
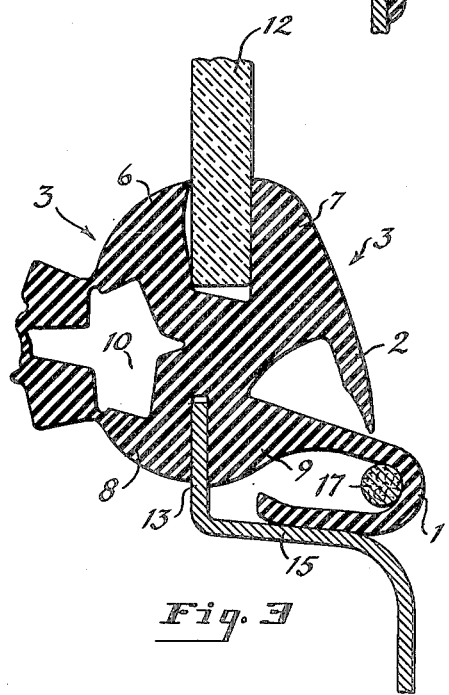
Fig. 3 is a cross-sectional view showing the sealing gasket as it is fit in with the body and glass prior to closing the toggle and pulling out the garnish leg.
Figure 5:
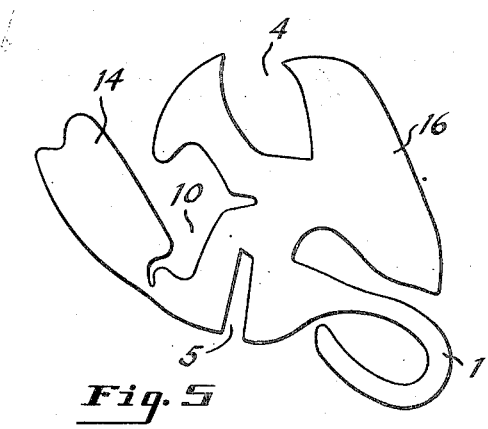
Fig. 5 is a cross-sectional view of an alternate form of gasket in which the wedging means is a flat filler strip instead of a toggle and the pressure leg is heavier and full, this gasket being shown in its natural shape or as extruded.

The sealing gasket is of the type which has oppositely disposed panel edge-receiving grooves 4 and 5 formed by integrally connected sealing flanges 6, 7, 8, and 9, and is characterized by a longitudinal hollow or opening 10 intermediate the grooves into which a wedging or expanding means 11 fits to force the flanges into tight engagement with the panels positioned in the grooves 4 and 5. Thus the groove for the glass panel 12 is formed by the flanges 6 and 7 and the groove for the body panel 13 is formed by the flanges 8 and 9. Intermediate the grooves is the longitudinal hollow or opening 10 disposed on one side of a plane passing through the midpoints of the two grooves and into which expanding means 11 fits to expand the rubberlike material of the seal body and press the flanges 6 and 8 into tight fitting engagement with the panels 12 and 13, respectively. The expanding means or filler 11 usually employed is an integral toggle arrangement as shown in Figs. 2, 3, and 4, but it can be any satisfactory means which forces the gasket flanges into tight holding engagement with the panels and locks itself in the hollow. Thus an alternate expanding means is shown in Fig. 5 which comprises a hinged flat filler strip 14. The toggle means is explained more fully in my copending application, Serial No. 119,852 and the hinged filler strip is explained more fully in my copending application, Serial No. 138,671, now Patent No. 2,625,716. Additional fillers such as that employed in the Eichner Patent No. 2,189,138 are equally serviceable with gaskets employing my invention.

The present invention relates particularly to mountings for glass panels in automobile and truck bodies. For this purpose the manufacturers need an inexpensive trim of some shape or form to cover the sharp juncture between the body and mounting gasket. As can be seen from Figs. 2 and 3, the body extends inwardly with a shelf or edge 15 from a short vertical flange to the car or cab interior and leaves a wide space to be gapped or otherwise covered and protected. Often the inner shelf or ledge 15 which is concealed has additional flanges or ridges therein which contain dangerous and potentially harmful edges which must be covered.

The original method of protecting this portion of the truck or car body was to form an additional groove in the gasket and hang a metal trim strip therein. This means was satisfactory but relatively expensive and required considerable assembly time.

Various garnish legs or trim flaps were tried but were unsatisfactory because they rested loosely against the body and would not hug and seal with it. Also great difficulty was encountered in forming these gaskets around the window glass corners. The garnish legs tended to bulge and wrinkle and come away from the vehicle body.

I have now discovered a very satisfactory garnish leg arrangement in which the garnish leg seals tightly with the vehicle body and does not bulge or wrinkle even at the corners. My invention comprises a relatively long slender garnish leg or garnish flap 1 characterized by a reverse curve or lap opening outward and away from the seal body and pressure leg and formed integrally with the outside panel or body-panel-side flange on the opposite side of the plane through the midpoints of the grooves 4 and 5 from the longitudinal hollow 10. I also have a relatively short pressure leg 2 formed integrally with the inside panel or glass-panel side flange 7 also on the opposite side from the hollow and extending downward to slight touching engagement with the garnish leg as shown. The long, finger-like garnish flap must have a curve or loop in it which opens out from the vehicle body and away from the pressure leg so that when extended it hugs and seals against the vehicle wall. At the same time the pressure leg 2 serves as a stiffening and restraining member which presses against the garnish leg and keeps it from bulging and buckling. The garnish leg and pressure leg should be separate to give freedom of action to the garnish leg so that it does not move with the pressure leg and upper flange 7. The garnish leg or trim flap should also be relatively long and narrow in cross-section and almost finger-like so that it can reach out and over the ledge of the vehicle body.

The leg curve or loop in the garnish leg should be such that in the natural position the edge-end of the leg is close to the body flange with which the leg itself is integral and located between that flange and the panel restrained by said flange. This is what is meant by the term "opening outward" previously used. This gives the leg considerable body hugging force when pulled out over the truck body and allows it to adjust to various body formations.

The pressure leg or flap retaining leg 2 should be relatively short and preferably narrow and wedge shaped. However, if desired, the pressure leg can be thicker and more solid as shown with leg 16 in Fig. 5. This type of pressure leg adds to the bulk of the gasket and makes it easier to form the gasket around corners without buckling.

Assembly of this type of gasket is relatively simple. The length of gasket needed to go around the inside panel or glass pane is determined and then measured off from a linear extruded length of gasket. The butt ends of the gasket are then vulcanized or cemented together so that an endless piece is formed. This is fitted around the inner window glass with the glass in the glass receiving groove. Then the glass is lifted and set in place in the cab or automobile window and the body fit into the body receiving groove. Adjustments are made and then the wedging means or toggle is snapped shut and the glass panel is firmly held in place.

Prior to assembly, the cord or string 17 is placed in the crook of the loop in the garnish leg 1 as shown in Fig. 3. This string extends completely around the gasket. The gasket is assembled with the garnish leg bent over or curled up in the wall as shown in Fig. 3. After the wedging means is forced into the hollow and the panels firmly retained, the cord or string 17 is pulled out from under the garnish leg and at the same time it pulls or snaps the garnish leg out and over the vehicle body wall. In this way a firm seal with the wall is achieved because the trim flap wants to return to a neutral position and hence is constantly pressing against the wall in an effort to do so.

It is thus evident that the present garnish leg invention is valuable, and unique and can be used in many ways. It is easily assembled and readily manufactured. The invention may be employed in various ways and only the preferred embodiments have been illustrated and described herein. It is understood that other adaptations may be made within the scope of the invention as provided in the patent statutes.

What I claim is:

1. A flexible linear seal of rubberlike material for joining two panel edges together, said seal having a body of uniform cross section with two spaced grooves disposed therein, a longitudinal opening in said body portion between the two grooves and disposed on one side of a longitudinal plane passing through the midpoints of the base of said grooves, expanding means for fitting into said longitudinal opening and expanding the rubberlike material of said body against the panels in said spaced grooves to hold the panels firmly therein, a relatively thin garnish leg extending from the outside seal body flange and on the side opposite from the longitudinal hollow, said garnish leg as formed having an outwardly returning loop therein, and a separate pressure leg having one unattached end and extending from the inside seal body flange on the side opposite from the longitudinal hollow and extending toward and almost to said garnish leg so that when said seal is assembled with panel edges and the garnish flap is fully extended, the unattached end of said pressure leg presses against and restrains said garnish leg from buckling.

2. A flexible linear seal of rubberlike material for joining together adjacent edges of rigid panel-like structures, said seal having a body portion of uniform cross-section with two spaced and generally opposite linear grooves therein, a longitudinal hollow in said body between said grooves, and toggle elements hingedly integral with said body and proportioned so that said toggle elements can be pressed together and sprung into said hollow to thereby compress portions of the body of the seal around edge portions of panels in said grooves to hold said edge portions firmly therein and cause said toggle elements to be held and locked in said hollow by resulting pressure exerted from the body of the seal pressing upon them, an elongated garnish leg extending out from the outside-panel flange on the side opposite from the longitudinal hollow and having as formed a loop therein opening outward away from the central portion of the seal body, and a separate pressure leg having one free end and extending from the inside-panel flange and towards the looped portion of the garnish leg so that when said seal is assembled with the adjacent edges of panel-like structures and the garnish leg is fully extended, the free end of said pressure leg presses against and restrains said garnish leg from buckling.

3. A flexible linear seal of rubberlike material for joining together adjacent edges of rigid panel-like structures, said seal having a body portion of uniform cross-section with two spaced and generally opposite linear grooves therein, a hollow in said body between said grooves and a hinged filler strip that can be pressed and locked into said hollow to force portions of the body of the seal around edge portions of the panels in said grooves to hold said edge portions firmly therein, an elongated garnish leg extending out from the outside seal body flange adjacent one panel receiving groove on the side opposite from the longitudinal hollow and having as formed a loop therein opening outward away from the central portion of the seal body and a separate pressure leg having one free end and extending from the inside seal body flange and adjacent the second panel receiving groove and towards the looped portion of the garnish leg so that when said seal is assembled with the adjacent edges of panel-like structures and the garnish leg is fully extended, the free end of said pressure leg presses against and restrains said garnish leg from buckling.

4. A flexible linear seal of rubberlike material for joining adjacent panel edges comprising a body of uniform cross-section with two spaced and generally opposite linear grooves therein, a longitudinal hollow in said body between said grooves, toggle elements hingedly integral with said body and proportioned so that said toggle elements can be pressed together and sprung into said hollow to thereby compress portions of the body of the seal against the panel edges and cause said toggle elements to be held and locked in said hollow by resulting pressure exerted from the body of the seal pressing upon them, a narrow, wedge-shaped retaining leg having one end thereof unattached and extending down and out from the inside-panel flange on the side opposite from the longitudinal hollow, and a long, finger-like garnish flap with a natural return curve therein opening out from said flap retaining leg, the flap retaining leg and garnish flap being so proportioned that when the seal is assembled and the flap pulled out into position it hugs the outside panel and is kept from buckling by outward pressure from the flap retaining leg.

5. A flexible linear seal of rubberlike material for joining adjacent panel edges comprising a body of uniform cross-section with two spaced and generally opposite linear grooves therein, a longitudinal hollow in said body between said grooves, expanding means for setting into said longitudinal opening and expanding the rubberlike material of said body against the panel edges to hold them firmly in the opposite linear grooves, a narrow, wedge-shaped retaining leg having one end thereof unattached and extending down and out from the inside-panel flange on the side opposite from the longitudinal hollow, and a long, finger-like garnish flap with a natural return curve therein opening out from said retaining leg, the retaining leg and garnish flap being so proportioned that when the seal is assembled and the flap pulled out into position it hugs the outside panel and is kept from buckling by outward pressure from the retaining leg.

6. A combination of (1) two adjacent panel edges joined by (2) a linear seal of rubberlike material having body of uniform cross-section with two spaced grooves disposed therein, a longitudinal opening in said body portion between the two grooves and disposed on one side of a longitudinal plane base through the midpoints of the base of said grooves, expanding means in said longitudinal opening which expand the rubberlike material of said body against the panel edges in said spaced grooves to hold the panels firmly therein, a relatively thin garnish leg extending from the outside seal body flange and on the side opposite from the longitudinal hollow and out into embracing relationship with the panel edge, and a separate pressure leg with one free end pressing against and restraining said garnish leg from buckling.

References Cited in the file of this patent

UNITED STATES PATENTS

| Number | Name | Date |
|---|---|---|
| 1,854,032 | Holt | Apr. 12, 1932 |
| 2,189,138 | Eichner | Feb. 6, 1940 |
| 2,288,329 | Smith | June 30, 1942 |
| 2,492,566 | Geyer | Dec. 27, 1949 |
| 2,497,276 | Scott et al. | Feb. 14, 1950 |
| 2,569,955 | Schassberger | Oct. 2, 1951 |
| 2,609,070 | Frehse | Sept. 2, 1952 |

FOREIGN PATENTS

| Number | Country | Date |
|---|---|---|
| 411,609 | Great Britain | June 14, 1934 |
| 620,325 | Great Britain | Mar. 23, 1949 |